March 18, 1941.     C. MACKERT     2,235,440
MOLDING APPARATUS
Filed Sept. 14, 1937     3 Sheets-Sheet 2
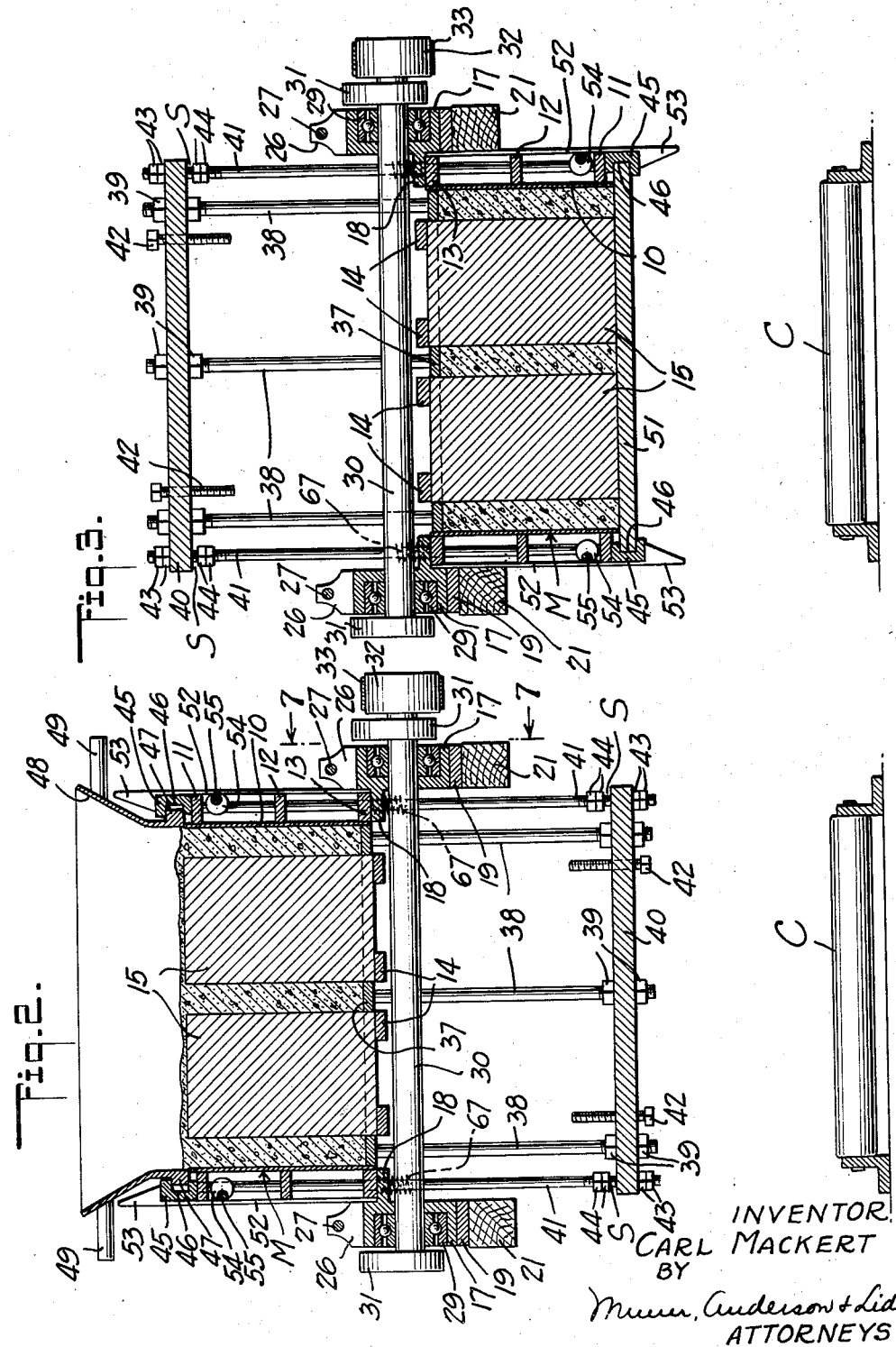

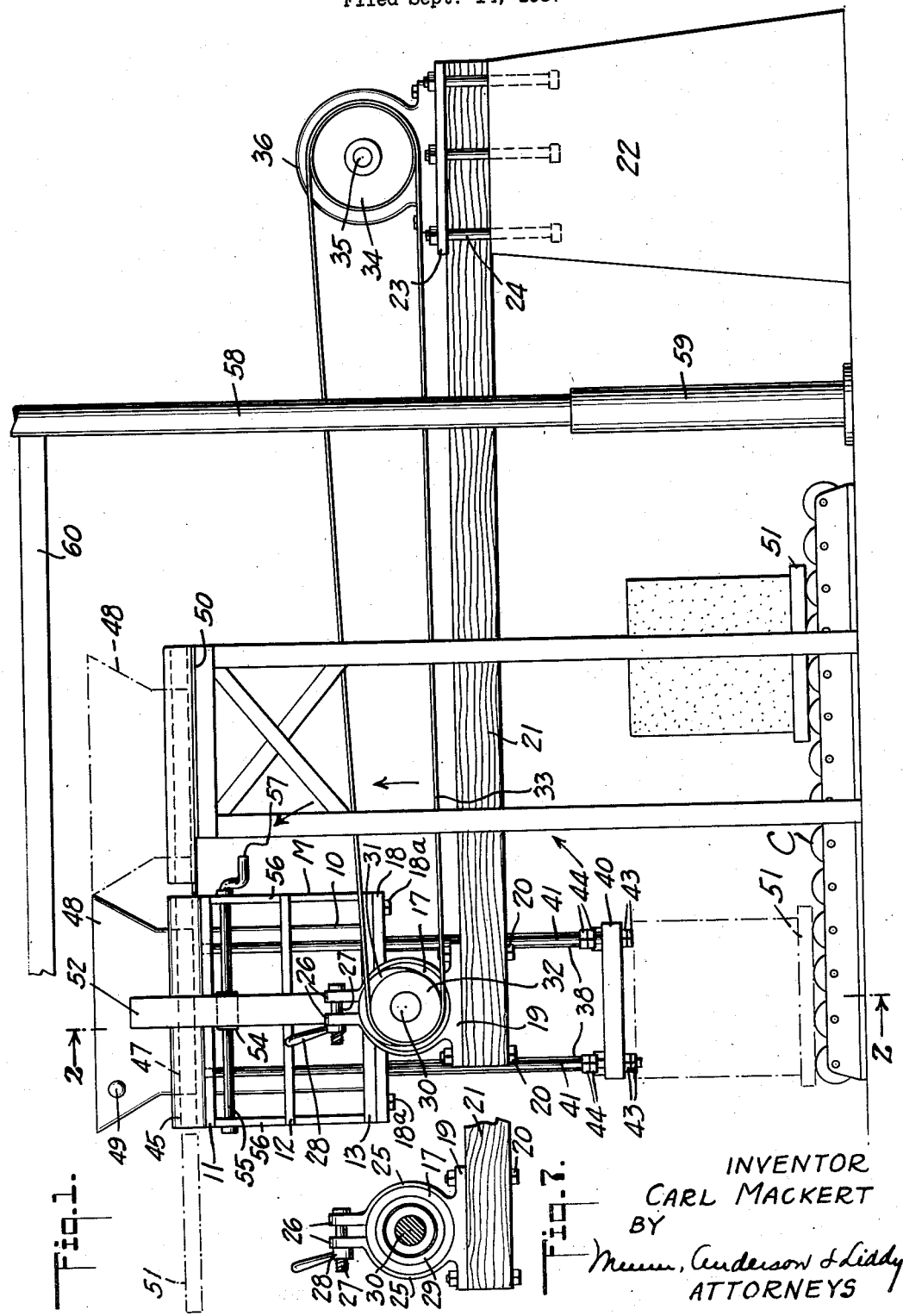

March 18, 1941.  C. MACKERT  2,235,440
MOLDING APPARATUS
Filed Sept. 14, 1937  3 Sheets-Sheet 3
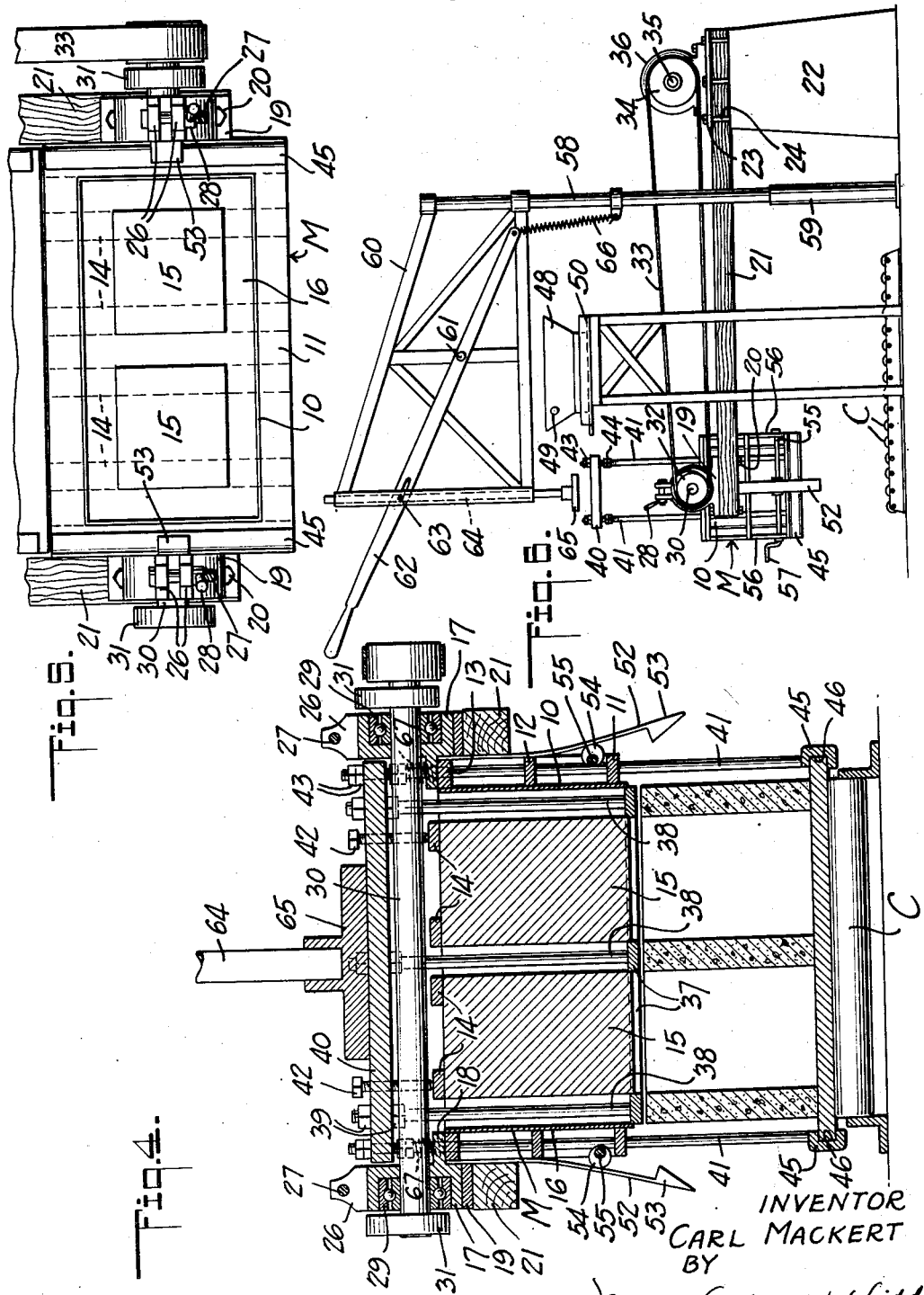
INVENTOR
CARL MACKERT
BY
Munn, Anderson & Liddy
ATTORNEYS Patented Mar. 18, 1941

2,235,440

UNITED STATES PATENT OFFICE 2,235,440

MOLDING APPARATUS

Carl Mackert, St. Anthony, Idaho

Application September 14, 1937, Serial No. 163,760

6 Claims. (Cl. 25—41)

This invention relates generally to the art of molding articles from plastic material.

An object of the invention is to provide an apparatus by which building blocks and other articles can be molded from any plastic or cementitious material in a manner to insure uniform density of the finished product in order to obtain maximum strength, as well as to produce an article which will be finished on all sides so as to be high grade in quality and appearance and be manufactured at a low cost.

Another object of the invention is to provide an apparatus by which the several steps of filling the mold, compacting the material by vibrating the mold when upright, striking off surplus material from the mold, inverting the mold and again compacting the material by vibrating the mold, and then stripping the product from the inverted mold, can be accomplished expeditiously and economically by a relatively unskilled operator in order to reduce to a minimum the cost of the finished product.

With these and other objects in view, the invention consists in the combinations and arrangements of elements as set forth in the following specification and particularly pointed out in the appended claims.

In the accompanying drawings,

Figure 1 is a view showing in side elevation one form of apparatus by which the method involved in this invention can be carried out;

Figure 2 is a transverse sectional view taken on the line 2—2 of Figure 1;

Figures 3 and 4 are views similar to Figure 2 and illustrating different positions occupied by the working parts of the apparatus in carrying out the method;

Figure 5 is a plan view of the mold embodied in the apparatus;

Figure 6 is a side view of the molding apparatus on a reduced scale, and showing the mold in stripping position;

Figure 7 is a fragmentary detail sectional view taken on the line 7—7 of Figure 2.

Referring specifically to the drawings, one form of apparatus by which the method embodied in the invention can be carried out is shown, and comprises a mold designated generally at M and constructed in the form of a rectangular sheet metal box 10 having an open top and bottom. The box is provided exteriorly with rectangular reinforcing frames 11, 12 and 13, to the latter of which are secured pairs of cross bars 14—14 supporting cores 15—15 in the box for co-action therewith in defining a mold space 16 which in plan (Figure 5) conforms to the shape of a hollow building block with an intermediate web, which is to be molded by the method embodied in the invention.

The mold M is provided with hollow trunnions 17—17 having flanges 18 through which bolts 18a extend into the frame 13 to rigidly secure the trunnions thereto. The trunnions 18 are rotatably mounted in brackets 19—19 secured by bolts 20—20 to the free ends of arms 21—21, the opposite ends of which rest upon and are anchored to a pier 22 by a plate 23 and bolts 24.

The arms 21 are in the present instance shown in the form of wooden beams having a degree of flexibility sufficient to mount the mold in an elevated position for vibratory movement for the purpose of compacting or settling a quantity of plastic material in the mold when the latter occupies the upright position shown in Figures 1 and 2 and the inverted position shown in Figures 3 and 6, all to be later fully described. The brackets 19 are split at their upper portions as shown in Figure 7 to provide flexible jaws 25 of arcuate form embracing the peripheries of the trunnions 17. The free ends of the jaws 25 (Figure 7) are provided with lugs 26 through which extend clamping screws 27 having handle carrying nuts 28 for co-action with the screws in clamping the trunnions in the brackets so as to retain the mold in upright position, yet permit the mold to be swung to inverted position upon loosening the nuts.

Anti-friction bearings 29—29 are seated in the trunnions 17 and serve to rotatably mount a shaft 30, to the outer ends of which are fixed unbalanced weights 31—31. To one end of the shaft 30 is also fixed a pulley 32 over which is trained an endless belt 33 also trained over a drive pulley 34 fixed to the shaft 35 of an electric motor 36 secured to the plate 23 so that when the motor is in operation to drive the shaft 30 at from 3,000 to 4,000 R. P. M., the unbalanced weights 31 will serve to intensely vibrate the mold.

The mold M is provided with a movable bottom 37 in the form of a plate having the plan contour of the mold space 16 and adapted to also constitute a stripper when the mold is inserted and the molded article is to be stripped therefrom. The bottom 37 is carried by three pairs of rods 38 adjustably secured by nuts 39—39 to a crosshead 40 mounted by two pairs of rods 41 on the mold box 10 for movement from the extreme position shown in Figure 2 wherein the bottom 37 occupies bottom forming position with respect to the mold space, to the extreme position shown in Figure 4 wherein the bottom 37 occupies article stripping position definitely limited by adjustable stop screws 42.

By means of pairs of nuts 43 and 44 on the rods 41, a predetermined lost motion operative connection is provided between the rods and the crosshead and is indicated by the space S in Figures 2, 3 and 4 to function in a manner to be later described. To mount the rods 41 they extend through suitable openings in the frames 11, 12 and 13 and are connected at their opposite ends beyond the frame 11 by stop members 45 in the form of bars having guideways 46 adapted to receive runners 47 on the opposite sides of a hopper 48 which can be shifted by handles 49 from a platform 50 to a position overlying and registering with the mold box 10 as shown, respectively, by the broken and full line positions of the hopper in Figure 1. When the hopper occupies its position on the platform 50, a plate 51 is adapted to be applied to the guideways 46 to form a bottom for the mold upon inversion of the latter, as shown in Figure 3, as well as a support for the molded article when stripped from the mold as shown in Figure 4, for movement of the article from beneath the mold on a suitable roller conveyor C.

The combined bottom and stripper 37 is adapted to be releasably retained against article stripping movement when the mold is inverted and the plastic material in the mold box is being compacted, by means of spring latches 52—52 fixed at one end to the frame 13 and having latching heads 53 engaging the stop members 45 as clearly shown in Figure 3. The latches 52 are adapted to be moved to non-latching position by cams 54—54 fixed to shafts 55—55 journaled in end plates 56 of the mold box and having cranks 57 by which the shafts can be rotated.

At one side and to the rear of the mold M is a standard 58 mounted to swing about a vertical axis in a sleeve bearing 59. From the standard projects laterally a frame 60 on which is pivoted at 61 an operating lever 62 having a pin and slot connection 63 with a presser bar 64 guided by the frame 60 in a rectilinear path vertically and having a presser foot 65 adapted to be disposed above and to exert downward pressure upon the crosshead 40 to force the molded article from the mold box when the latches 52 occupy non-latching position. The operating lever and associated parts are normally urged to the elevated position shown in Figure 6 by a spring 66; and it will be understood that during the molding operation the frame 60 is swung to an inactive position at one side of the mold. It will be noted that short coil springs 67 are mounted on the rods 41 for the purpose of cushioning the final portion of the movement of the molded article from the mold box.

The method embodied in this invention and the operation of the apparatus conjointly therewith is as follows:

Let it be assumed that the mold M is clamped by the nuts 28 in the upright position shown in Figures 1 and 2, and that a sufficient quantity of plastic material for at least a single filling of the mold box 10 has been supplied to the hopper 48 in its position on the platform 50, as shown in broken lines in Figure 1. The hopper is now manually shifted by the handles 49 from the platform onto the mold so as to be alined with the mold box and permit the plastic material to gravitate into the latter.

Current from a suitable source is supplied to the motor 36 to intensely agitate or vibrate the mold and thus compact the plastic material in the mold space 16. When the material has been thus compacted, operation of the motor is discontinued and the hopper is shifted back onto the platform 50, thus causing the hopper to strike off the top of the mold box and remove surplus material which is retained in the hopper.

The plate 51 is now slid into the guideways 46 so as to overlie and thus close the top of the mold box, following which the nuts 28 are loosened and the mold rotated through one hundred eighty degrees from the upright position shown in Figures 1 and 2 to the inverted position shown in Figure 3. The plate 51 now forms the bottom of the mold and supports the body of plastic material in the mold space, as this bottom forming plate is securely held by the members 45 which are retained in the elevated position shown in Figure 3 by the latches 53. However, by virtue of the aforementioned lost motion operative connection provided by the nuts 43 and 44 between the rods 41 and the crosshead 39 as indicated by the space S in Figure 3, the weight of the crosshead, the rods 38 and the plate 37 is resting upon the plastic body in the mold space.

Current is again supplied to the motor 36 to again intensely vibrate the mold and thus cause a reversed and further compacting of the material until the plate 37 has moved downwardly a sufficient amount to take up the space S between the cross-head 40 and nuts 44.

Operation of the motor is now discontinued and the finished block is ready to be stripped from the mold box. The cranks 57 are rotated to move the latches 52 to non-latching position, thus releasing the members 45 and leaving the bottom forming plate 51 free to move downward.

The frame 60 is now swung over the mold, and the presser foot 65 forced downwardly by the lever 62 upon the crosshead 40 so as to cause the plate 37 to advance downwardly into the mold space 16 and thus strip the block from the mold. When the plate 37 has been advanced sufficiently to clear the top of the block from the mold, the stop screws 42 strike the cross bars 14 of the mold box and arrest further downward movement of the plate 37.

However, due to the aforesaid space S which is now present between the crosshead 40 and the nuts 43, the plate 51 and the members 45 and rods 41 are free to move downward until such space is again taken up, with the result that when the plate 51 is resting upon the conveyor C as shown in Figure 4, the top of the block will be clear of the bottom surface of the plate 37 and the block thus entirely free of the mold for movement on the conveyor. During this final downward movement of the block the springs 67 function to cushion the impact of the plate 51 on the rollers of the conveyor in order to prevent damaging the block, which, although sufficiently compact to be self-supporting, is still in an unset state.

It will be appreciated that by this method the block will be finished on all sides and will be of uniform density throughout its mass. Upon restoring the mold to its upright position, and relatching the plate 37 in its original position, the method of molding the block as above described can be repeated.

What is claimed is:

1. Molding apparatus comprising a mold having a movable bottom; means mounting the mold for movement to occupy upright and inverted positions; means for vibrating the mold to compact a body of plastic material in the mold when upright; means defining a bottom for the mold when inverted, so as to enable the plastic body to be reversely compacted in the mold by said mold vibrating means; means for imposing the weight of the first said bottom on the top of the body when the mold is inverted, so as to aid in said reverse compacting of the body; and means for actuating the first said bottom to strip the body from the mold when inverted.

2. Molding apparatus comprising a mold having a movable bottom; means mounting the mold for movement to occupy upright and inverted position; means for vibrating the mold to compact a body of plastic material in the mold when upright; means defining a bottom for the mold when inverted, so as to enable the plastic body to be reversely compacted in the mold by said mold vibrating means; means for imposing the weight of the first said bottom on the top of the body when the mold is inverted, so as to aid in said reverse compacting of the body; means for actuating the first said bottom to strip the body from the mold when inverted; and means for clearing the top of the body from the first said bottom following stripping of the body from the mold.

3. Molding apparatus comprising a mold; means mounting the mold for movement to occupy upright and inverted positions; mold vibrating means by which a body of plastic material in the mold will be compacted when the mold is upright, and reversely compacted when the mold is inverted; means for stripping the compacted body from the mold, when inverted; and means by which the last means is caused to apply pressure to the top of the body when the mold is inverted, so as to aid in reversely compacting the body.

4. Molding apparatus comprising a mold having trunnions; a flexible support co-acting with said trunnions to mount the mold for rotary adjustment to occupy upright and inverted positions; a shaft journaled in the trunnions and having means for vibrating the mold in response to rotation of the shaft; means for driving the shaft; and means for stripping the product from the mold when inverted.

5. Molding apparatus comprising a mold having trunnions; a flexible support co-acting with said trunnions to mount the mold for rotary adjustment to occupy upright and inverted positions; a shaft journaled in the trunnions and having means for vibrating the mold in response to rotation of the shaft; means for driving the shaft; means defining a bottom for the mold when inverted; means for removably associating the bottom with the mold; and means for stripping the product from the mold when inverted, and with the product remaining supported by said bottom.

6. Molding apparatus comprising a mold having a movable bottom; means mounting the mold for movement to occupy upright and inverted positions; means for vibrating the mold to compact a body of plastic material in the mold when upright; means defining a bottom for the mold when inverted, so as to enable the plastic body to be reversely compacted in the mold by said mold vibrating maens; means mounting the second said bottom from the mold for movement from the aforesaid bottom forming position to a position wherein it will support the body below the mold; means providing a lost motion operative connection between the first and second mentioned bottoms, by which the degree of compaction of the plastic body in the inverted position of the mold is determined; means for releasably retaining the second mentioned bottom in bottom forming position; and means for actuating the retaining means to release the second said bottom for movement to its body supporting position below the mold wherein said lost motion operative connection disposes the top of the body clear of the first said bottom.

CARL MACKERT.